United States Patent [19]

Siebert

[11] Patent Number: 5,594,256
[45] Date of Patent: Jan. 14, 1997

[54] HIGH VOLTAGE SWITCH FOR POCKELS CELLS

[75] Inventor: Larry D. Siebert, Ann Arbor, Mich.

[73] Assignee: Clark-MXR, Inc., Dexter, Mich.

[21] Appl. No.: 372,149

[22] Filed: Jan. 13, 1995

[51] Int. Cl.⁶ .................................................. G02B 27/00
[52] U.S. Cl. .......................... 250/551; 250/214 R; 372/9
[58] Field of Search ........................... 250/214.1, 214 R, 250/214 P, 214 LA, 214 LS, 214 SW; 372/9, 10, 12

[56] References Cited

U.S. PATENT DOCUMENTS

| | | |
|---|---|---|
| 3,577,097 | 5/1971 | Hilberg .......................... 372/12 |
| 3,849,732 | 11/1974 | Pezot ............................. 327/291 |
| 3,910,679 | 10/1975 | Rushworth et al. .......... 359/264 |
| 4,347,437 | 8/1982 | Mourou ........................ 250/214.1 |
| 4,568,834 | 2/1986 | Sherman et al. . |
| 4,571,085 | 2/1986 | Anderson . |
| 4,620,113 | 10/1986 | Sizer et al. . |
| 4,629,993 | 12/1986 | Bouvier et al. . |
| 4,871,920 | 10/1989 | Stabile et al. . |
| 5,013,926 | 5/1991 | Aizawa . |
| 5,045,709 | 9/1991 | Ogawa . |
| 5,121,401 | 6/1992 | Dahl . |
| 5,162,657 | 11/1992 | Sturzebecher et al. . |
| 5,223,446 | 6/1993 | Miyajima et al. . |

*Primary Examiner*—Edward P. Westin
*Assistant Examiner*—John R. Lee
*Attorney, Agent, or Firm*—Cumpston & Shaw

[57] ABSTRACT

A high voltage switch for discharging a storage capacitor to increase the voltage across a pockels cell includes a plurality of semi-conductor devices conducted in series with the pockels cell and the capacitor, each of the semiconductor devices having a control input; a plurality of fast, light responsive devices connected to the control input of each semiconductor device of the plurality of semiconductive devices respectively for switching the respective device from a non-conducting state to a conducting state; and a controlled, fast rise time light source optically coupled to all of the fast light responsive devices for simultaneously triggering all of the semi-conductor devices.

13 Claims, 4 Drawing Sheets

FIG. 2
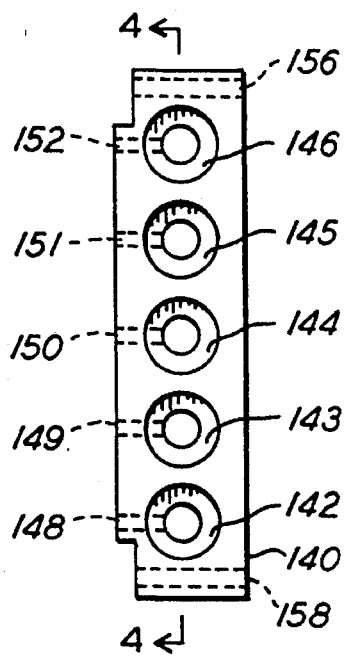
FIG. 3
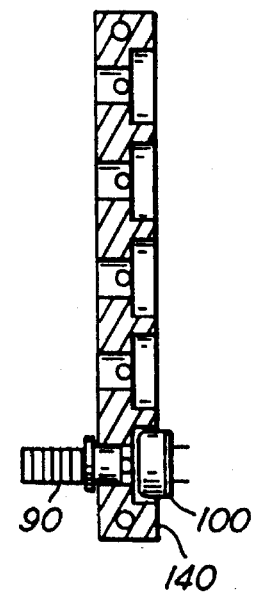
FIG. 4
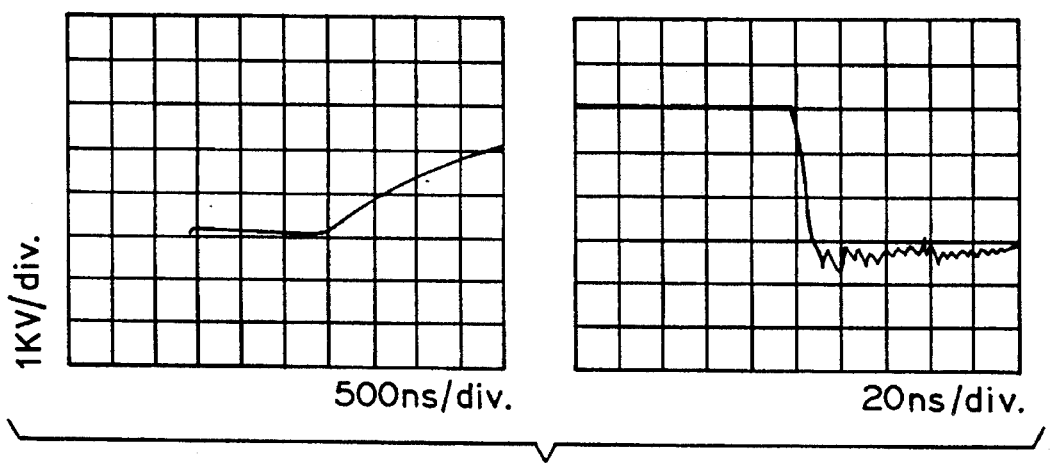
FIG. 5

HIGH VOLTAGE SWITCH FOR POCKELS CELLS

The U.S. Government has a paid-up license in this invention and the right in limited circumstances to require the patent owner to license others on reasonable terms, as provided for by the terms of Contract No. DAAH01-92-C-R219 awarded by the Department of Defense.

FIELD OF THE INVENTION

This invention relates generally to fast high voltage switches and more particularly to an optically coupled metal oxide semiconductor field effect transistor (MOSFET) switch for switching a fast pockels cell.

Lasers designed to produce short and very short pulses, in the pico second and femto second ranges, require commensurately fast pockels cell switches. A number of methods for switching a pockels cell used in an optical shutter or the like have been utilized in the past. Pockels cells require that relatively high voltages be switched and one method has utilized a transmission line, known as a charge line, connected to the cell and charged or discharged through a switch, usually a gas tube switch, so as to control the transmission of polarized light through the cell. By timing the discharge of the line, one or more laser pulses may be switched out or selected for use from a first pulse from a multi laser.

Where charge lines have not been used, capacitors, charged to a high voltage and then discharged through avalanche transistor stacks to develop the voltages for controlling the polarization presented by the pockels cell have been employed. U.S. Pat. Nos. 3,577,097 and 3,849,732 show the use of charge lines in pockels cell driver circuits. U.S. Pat. No. 3,910,679 shows the use of avalanche strings of transistors and storage capacitors in pockels cell drivers. Charges lines require that substantial currents be switched, and this places requirements on the switching device that are difficult to meet. Where gas tubes have been employed, the high switching currents often result in the destruction of the tube. A jitter in the timing of the transmission through the pockels cell also occurs when known drivers, such as microwave tubes are employed, and this limits the accuracy with which the pockels cell can be switched.

In U.S. Pat. No. 4,620,113 Sizer et al. describe a pockels cell driver circuit that utilizes a microwave triode and means for selectively triggering the triode into conduction for short periods of time. The anode of the triode is connected to a high voltage supply through a high resistance, current limiting resistor. The junction between the current limiting resistor and the anode of the triode is connected to the pockels cell through a storage capacitor having a capacitance much higher (typically ten times greater) than the capacitance presented by the pockels cell. The pockels cell and the storage capacitor in series are connected across the triode. When the triode is triggered, the pockels cell charges and the voltage across it passes through its half wave length voltage where the polarization presented by the cell enables transmission of polarized light through the cell and its cooperating crossed polarizers. An over voltage avalanche device, such as an avalanche transistor stack may be connected across the pockels cell so as to provide a discharge path for the pockels cell when the half wave length voltage is reached, so that a transmission interval cannot occur until the next shot or cycle, when the triode is again triggered.

In U.S. Pat. No. 4,629,993, Bouvier et al. describe a pockels cell driver capable of increasing the voltage across a pockels cell in steps to provide both quarter-wave and half-wave retardation separated by the requisite interval, so as to facilitate the amplification of pulses in regenerative laser amplifiers over wide repetition rates, for example, up to 20 kilohertz. The improved pockels cell driver utilizes a plurality of pulse amplifiers, each preferably including a plurality of field effect transistor stages acting as current amplifiers which decrease the rise time of the pulses outputted therefrom. Each of the amplifiers has an output connected to the grid of a microwave tube for applying an amplified pulse corresponding to the trigger pulse which is applied thereto, to the grid of the tube to enable the cell to charge to each of the voltage steps with the selected delays therebetween.

Anderson U.S. Pat. No. 4,571,085 shows apparatus for making decay time measurements that includes a pockels cell driven by a MOSFET. The MOSFET is triggered by a flip flop that is triggered by the output of a comparator, that is in turn driven by an amplified output signal from a photo detector. The photo detector is triggered by a laser. The system has a time resolution of only about 10 nano seconds, and the voltage pulse delivered to the pockels cells only about 200 volts.

Ogawa U.S. Pat. No. 5,045,709 describes an optically coupled solid state relay comprising an optical coupler having a light emitting element coupled between input terminals for producing an optical radiation in the presence of a driving current, first photo voltaic means for producing a first photo current at a first voltage level in the presence of the optical radiation, and second photo voltaic means for producing a second photo current at a second voltage level in the presence of the optical radiation, a first output circuit having an enhancement mode field effect transistor coupled to the first photo voltaic means and provided in association with normally open output terminals, a first discharging circuit activated in the absence of the optical radiation and discharging the first voltage level, a second output circuit having a depletion mode field effect transistor coupled to the second photo voltaic means, and provided in association with normally closed output terminals, and a second discharging circuit activated in the absence of the optical radiation and discharging a second voltage level, in which the amount of the second photo current is larger than that of the first photo current and the enhancement mode field effect transistor is larger in the absolute value of a threshold level than the depletion mode field effect transistor, so that the depletion mode effect transistor turns off before the enhancement mode field effect transistor turns on, wherein the first discharging circuit starts in a discharging operation thereof earlier than the second discharging circuit, so that the enhancement field effect transistor turns off before the depletion mode field effect transistor turns on.

Stabile et al. U.S. Pat. No. 4,871,920 shows the use of a plurality of series coupled laser diodes coupled to an input signal source, in combination with PIN diode means optically coupled to the laser diodes, for providing an output signal to a load having an impedance matched to the impedance of the PIN diode.

Sturzebecher et al. U.S. Pat. No. 5,162,657 shows apparatus for optically controlling a microwave variable attenuator. The apparatus includes a light source for emitting light at a wavelength in the region of $0.5\mu$ to $1\mu$, control means coupled to the light source for controlling the intensity of the light emitted from the source, a fixed resistance, a GaAs multi-finger FET having parallel connected sources and parallel connected drains and parallel connected gate fingers, circuit means for connecting the sources and drains of the FET in series circuit with the fixed resistance across a source of positive DC voltage, optic fiber means optically coupled from the light source on the surface of the FET between the source and the drains of the FET, and covering substantially all of the gate fingers of the FET, gate biasing means coupled to the gates of the FET for biasing the FET to a point near pinch-off to maximize the light sensitivity of the FET and further circuitry for connecting the FET to the attenuator.

None of these prior patents provides a complete and satisfactory solution to the problem of providing a fast stable high voltage switch for a pockels cell that is reliable, is capable of providing a high repetition rate, exhibits low jitter and low cost. The device shown in the Anderson patent is much too slow for the purposes of the present invention. We require time delay jitter under 100 pico seconds and rise times on the order of 5 nano seconds or less. The device must be capable of switching about 4,000 volts. The Ogawa and Aizawa patents appears to be directed to a solid state relay of the type used to control motors or AC devices. There is no suggestion that the techniques used therein would be useful in driving a pockels cell. The devices described are much too slow, probably because the requirements of optically coupled relays are altogether different from pockels cell drivers. It is apparent from the patent that rise times on the order necessary for driving pockels cells are not a concern, since the patent does not even mention the Miller capacitance effect that dominates the rise time limit in high voltage high speed MOSFET circuits, nor the effect of source inductance. These effects are not significant in slow devices as described by Ogawa.

The Stabile patent is primarily directed towards RF amplification, including pulsed RF amplification. It is not applicable to driving a pockels cell which is primarily a capacitive load requiring a precise "on" and "off" voltage pulse. Also, the laser diode-PIN diode technique described in the patent does not operate in a saturated mode that would maintain the precise On and Off voltages for long periods of time (micro seconds). No mention is made in the patent of the impedance mismatch problem caused by pockels cell capacitance that would present a major problem with rise time and ringing.

In addition to these factors, a significant disadvantage arises from use of the Stabile approach, because large numbers of very expensive laser diodes and special PIN diodes would be needed.

The Sturzbecher approach uses an inherently slow light emitting diode together with a number of operational amplifiers, the cumulative effect of which is to provide rise times much longer than are desired for pockels cell drivers.

The Sherman patent also uses light emitting diodes in a low voltage application which provides switching that is both too slow and at too low a voltage to be applicable to switching pockels cells as in the present invention.

The Sizer patent shows an approach that competes directly with the apparatus of this invention. However, the microwave triodes used in the Sizer apparatus are expensive ($800.00 each or more) and are inefficient inasmuch as they dissipate substantial heat and require much higher voltages than are needed in the present invention.

The Bouvier patent is another microwave triode switch patent that has the same disadvantages as the apparatus shown in the Sizer patent.

Aizawa U.S. Pat. No. 5,013,926 shows the combination of a light emitting diode connected to an input signal, a photoelectromotive force diode array for generating a voltage upon reception of an optical signal from the light emitting diode, a rectifying element connected to the diode array, and a MOSFET having a gate connected to the rectifying element. The use of light emitting diodes and photo diodes make this approach too slow for a pockels cell driver, and there is no suggestion for providing apparatus for switching high voltage pulses as are required.

Dahl U.S. Pat. No. 5,121,401 shows apparatus for providing pulses of electrical energy to a laser diode in response to a trigger signal. A transmission line section having an electrical charge stored therein is connected to a MOSFET having its control electrode connected to a trigger supply signal for discharging the transmission line through a laser diode to provide pulses of light. This circuit provides fast switching, but for low voltages, and employs an expensive switch.

Miyajama et al. U.S. Pat. No. 5,223,446 shows a solid state implementation of the circuit shown in Izawa, which shares the same problems of slow response time.

It is an object of this invention to provide a reliable fast high repetition rate low jitter low cost high voltage switch for a pockels cell that overcomes the disadvantages of known switches.

It is a particular object of this invention to provide a pockels cell driver that takes advantage of the characteristics of MOSFETS, while providing higher speeds than might be thought possible, by compensating for the internal capacitances of the MOSFET power transistors.

It is a further object of this invention to provide a pockels cell driver having better isolation between the triggering source and the pockels cell than has been available before.

SUMMARY OF THE INVENTION

Briefly stated, and in accordance with a presently preferred embodiment of the invention, a high voltage switch for discharging a storage capacitor to increase the voltage across a pockels cell comprises a plurality of semi-conductor devices conducted in series with the pockels cell and the capacitor, each of the semiconductor devices having a control input; a plurality of fast, light responsive devices connected to the control input of each semiconductor device of the plurality of semiconductive devices respectively for switching the respective device from a non-conducting state to a conducting state; and a controlled, fast rise time light source optically coupled to all of the fast light responsive devices for simultaneously triggering all of the semi-conductor devices.

In accordance with another aspect of this invention, the high voltage switch includes means connected between the light responsive devices and the controlled fast rise time light source for adjusting the coupling between the light source and each of the light responsive devices for equalizing the turn on times of the semiconductive devices.

In accordance with still another aspect of the invention, the means for adjusting the coupling is a variable attenuator, for example, a translucent member disposed between the light source and each of the devices. Preferably, the translucent member is a dielectric member for increasing the isolation between the light sources and the light responsive devices.

In accordance with yet another embodiment of the invention, the fast rise time light sources comprise fast pulse laser diodes and the semiconductor devices comprise MOSFET high voltage switches.

In accordance with a still further embodiment of the invention, a lens is disposed between the light source and the light responsive devices, preferably a gradient index lens. A switch in accordance with this invention is capable of providing a total rise time less than about 5 nano seconds.

BRIEF DESCRIPTION OF THE DRAWING

While the novel aspects of the invention are set forth with particularity in the appended claims, the invention itself together with further objects and advantages thereof may be more readily comprehended by reference to the following detailed description of a presently preferred embodiment of the invention taken in conjunction with the accompanying drawing, in which:

FIG. 3 is a top view of a laser diode-photo diode fixture in accordance with this invention;

FIG. 4 is a section taken along lines 4—4 of FIG. 3; and

FIG. 5 is a wave form diagram of the output voltage wave form from a four section MOSFET switch in accordance with this invention.

DETAILED DESCRIPTION OF THE DRAWINGS

Figure 1:
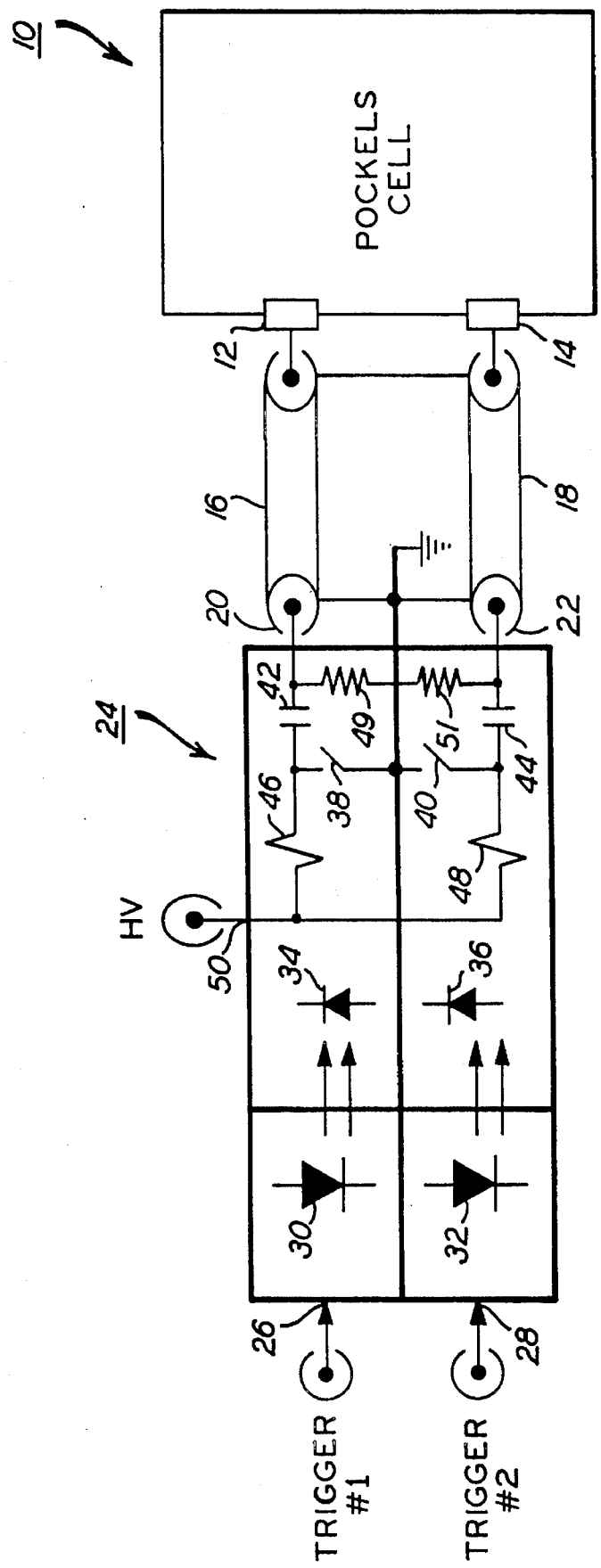
FIG. 1 is a block diagram schematic of a pockels cell shown connected to a pair of high voltage switches in accordance with this invention.

Referring now to FIG. 1, a pockels cell designated generally at 10 includes first and second high voltage terminals 12 and 14. The pockels cell is connected by means of a pair of high voltage coaxial cables 16 and 18 to the output terminals 20 and 22 of the pockels cell driver 24. The pockels cell driver includes trigger inputs 26 and 28 to which trigger signals can be applied from a suitable source. The trigger signals applied to inputs 26 and 28 are coupled to laser diodes 30 and 32, which are preferably fast laser diodes such as LD65 laser diodes manufactured by Laser Diode, Inc., New Brunswick, N.J. Laser diodes 30 and 32 are optically coupled photo diodes 34 and 36. The photo diodes are preferably high speed photo diodes such as EGG FND-100 photo diodes. The photo diodes are connected to the gates of MOSFET switches 38 and 40, which are shown schematically as single pole switches in FIG. 1. The switches are connected between high voltage capacitors 42 and 44, which are connected to outputs 20 and 22 of the pockels cell driver. Capacitors 42 and 44 are connected through resistors 46 and 48 to a high voltage input terminal 50 adapted to be connected to a high voltage source. Capacitors 42 and 44 are DC isolation capacitors to keep continuous high voltage off the pockels cell. Resistors 49 and 51 keep the pockels cell terminals at ground level in the steady state condition. In operation the voltage across these capacitors does not change significantly. Thus in the steady state condition the pockels cell has no voltage across its terminals. When switch 38 is closed a negative voltage pulse is applied to terminal 12 of the pockels cell which activates it. Likewise when switch 40 is closed a negative pulse is applied to terminal 14 of the pockels cell which reduces the potential difference across the pockels cell to zero again and deactivates it. The time delay between these pulses determines the pockels cell "On" time. In the time between the pulses both FET switches are turned off, the FET switches have their internal capacitances recharged, and the pockels cell terminal voltages return to ground time. The rise time of the pulse through the pockels cell is determined by the speed of switches 38 and 40.

Figure 2A:
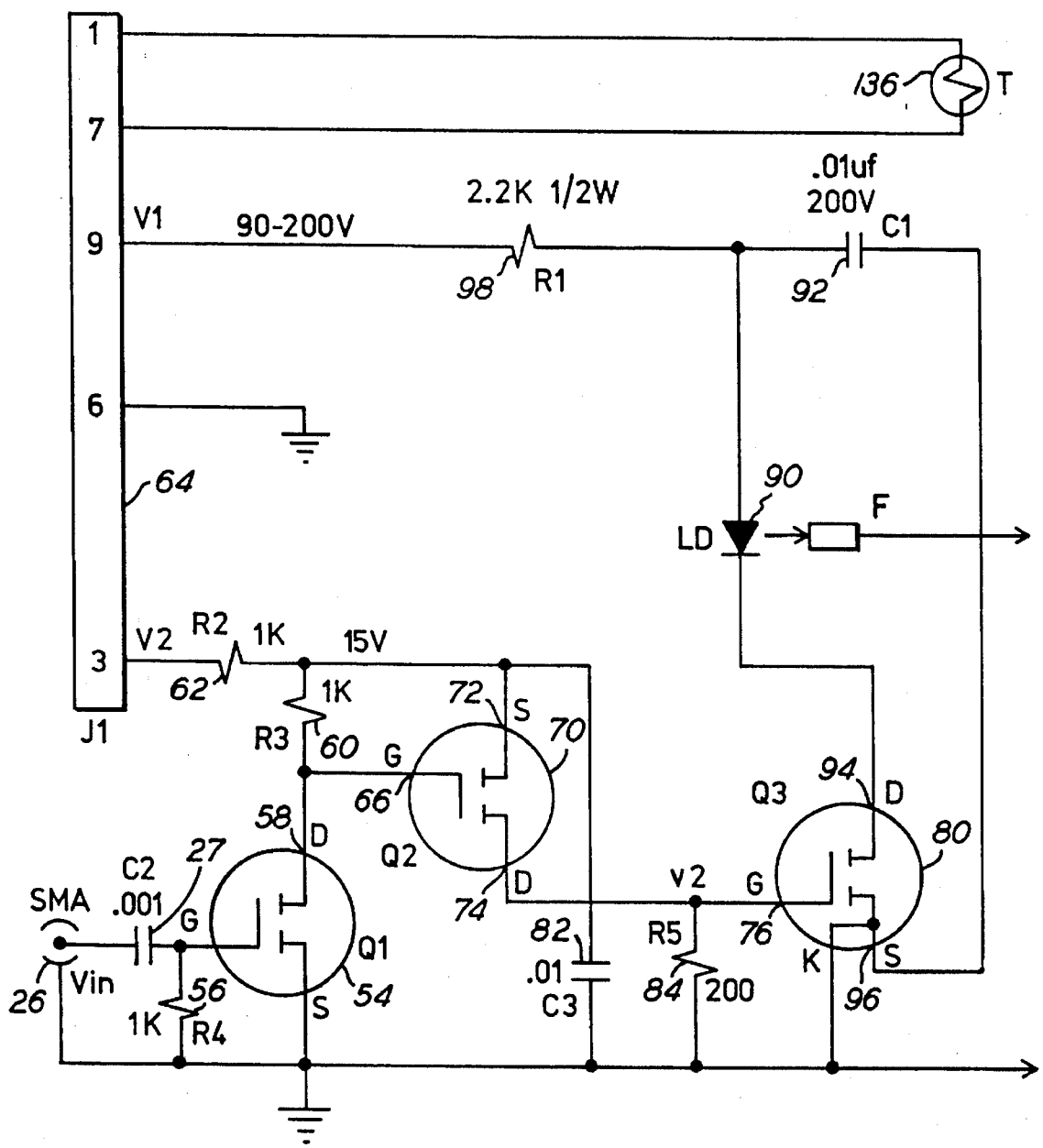
FIGS. 2A and 2B are a schematic diagram of the high voltage switch portion of the pockels cell driver in accordance with FIG. 1.
Figure 2B:
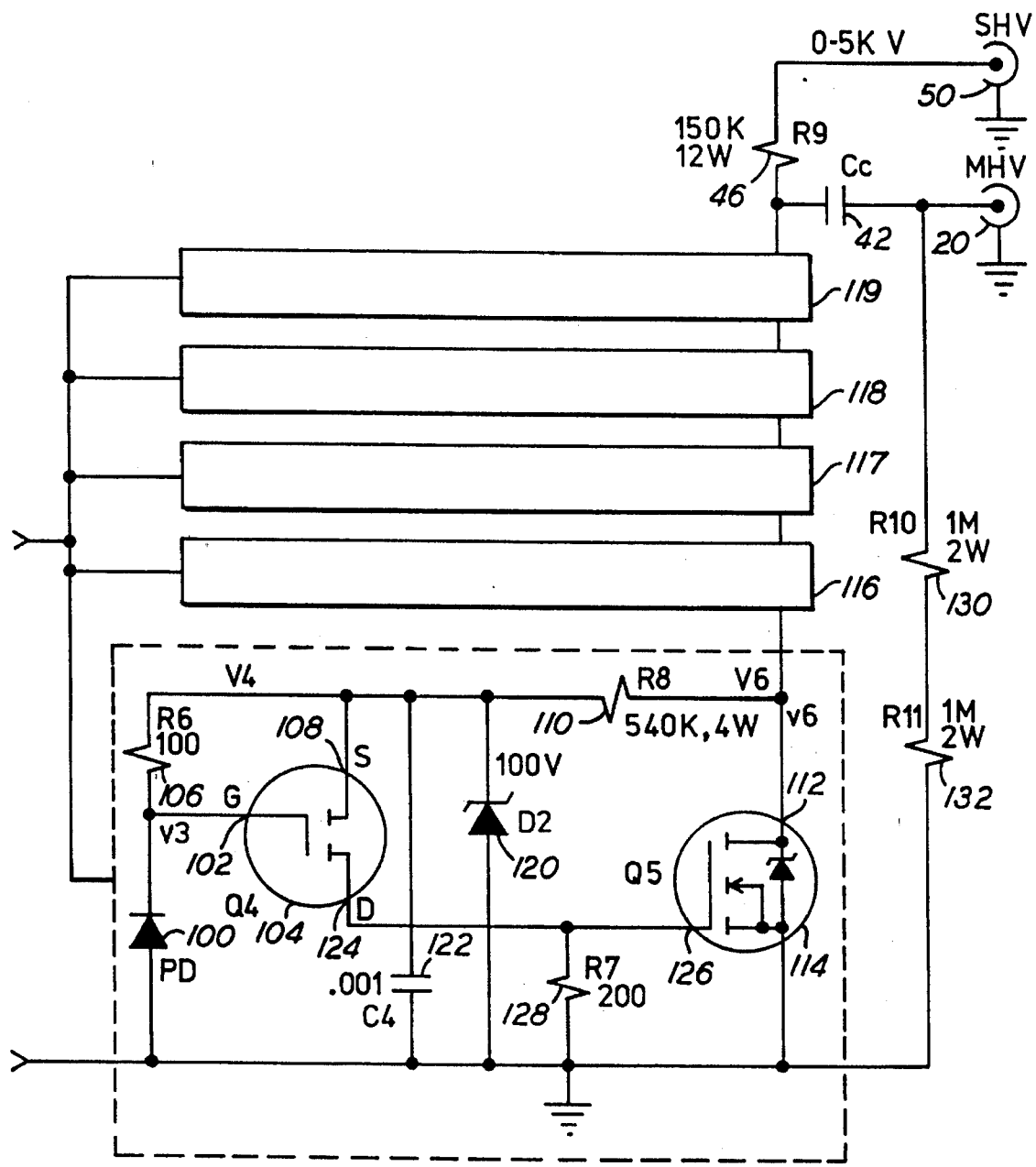

FIGS. 2A and 2B are a more detailed schematic diagram of the pockels cell driver 24. FIGS. 2A and 2B show only one section of the pockels cell driver shown in FIG. 1; the second section is substantially identical. Input terminal 26 is coupled through a small coupling capacitor to the gate of a first field effect transistor 54, arranged in a common source configuration with a gate resistor 56 connected between the gate and the ground, the source grounded and the drain 58 connected through a drain resistor 60, and a current limiting resistor 62 to an input terminal of a connector 64. The drain 58 of transistor 54 is connected to the gate terminal 66 of a second field effect transistor 70 having its source 72 connected to the current limiting resistor 62 and its drain 74 connected to the gate terminal 76 of a third field effect transistor 80. A decoupling capacitor 82 is connected to the source of transistor 70 and a gate resistor 84 is connected to the gate of transistor 80.

A fast laser diode such as an LD 65 or LD 66 laser diode 90 and a storage capacitor 92 are connected in series between the drain 94 and the source 96 of transistor 80. Capacitor 92 is charged through a current limiting resistor 98 connected to a source of intermediate voltage by way of connector 64. Preferably, between 90 and 200 volts is applied through resistor 98 to charge capacitor 92 to a voltage in that range, while transistor 80 is off, and to discharge the capacitor through laser diode 90 when transistor 80 is turned on.

Laser diode 90 is coupled in parallel to a plurality (here 5) of identical MOSFET switch sections. Fiber optic coupling is preferred, simpler methods may also be employed including directly coupling a series of laser diodes 90 to a plurality of fast photo diodes either directly or through a lens, preferably a gradient index lens.

Returning to FIG. 2, laser diode 90 is optically coupled to a photo diode 100 which is connected to the gate 102 of field effect transistor 104. a bias resistor 106 is connected between the gate 102 and source 108. Source 108 is connected through a current limiting resistor 110 to the drain 112 of a series array of high voltage MOSFET switches 114 and four identical switches, one in each of the MOSFET switching sections 116, 117, 118 and 119.

An avalanche diode, preferably a zener diode 120 regulates the voltage on the source of transistor 104. A capacitor 122 connected between source 108 and ground is charged, while transistor 104 is off. Drain terminal 124 of transistor 104 is connected to gate terminal 126 of transistor 114. A small bias resistor 128 keeps transistor 114 off until it is triggered by transistor 104.

The series string of high voltage MOSFET switching transistors 114–119 is connected to high voltage terminal 50 through series current limiting resistor 46. DC isolation capacitor 42 is connected to pockels cell output terminal 20, and to the series combination of resistors 130 and 132. Preferably, a thermistor 136 is connected to connector 64 for monitoring the temperature of the semiconductor switches.

By way of illustration, the following component values illustrate an exemplary embodiment of the invention:

| Ref No. | Description |
| --- | --- |
| 27 | .001 uf |
| 42 | .001 uf, 6KV |
| 46 | 150K 12W |

-continued

| Ref No. | Description |
| --- | --- |
| 50 | 1/8 W carbon, 5% 1KΩ |
| 54 | 1RFD1Z0 (or IRFD 123) |
| 56 | 1/8 W carbon, 5% 1KΩ |
| 60 | 1K 1/8W. 5% carbon |
| 62 | 1/4 W 1KΩ |
| 64 | 9 pin D connector |
| 70 | VP1008L |
| 80 | IRC640, (MPT10N10M) |
| 82 | .01 uf |
| 84 | 200 1/8W. 5% carbon |
| 90 | Laser Diode LD65 |
| 92 | .01 uf, 200 V, + −10% |
| 98 | 2.2K 52 1/2W. |
| 100 | EGG FND 100 |
| 104 | VP1008L |
| 106 | 100 1/8W. 5% carbon |
| 110 | 540K 4W |
| 114 | ATP1004RKN |
| 120 | 1N5271B |
| 122 | .001 uf, 100 V, + −10% |
| 128 | 200 Ω 1/8W 5% carbon |
| 130 | 1M 2W |
| 132 | 1M 2W |
| 136 | Thermistor, Keystone R10703-5744-103-S1 |

FIG. 3 shows a fixture for coupling a plurality of laser diodes to a like plurality of photo sensitive diodes having an adjustment for controlling the coupling between the two devices. A block of preferably acrylic material 140 is provided having a number of through bores 142–146 for accommodating a plurality of laser diode-photo diode pairs. The through bores have a first diameter for engaging the photo diodes and a second diameter for engaging the laser diodes as seen more clearly in the section view of FIG. 4. A plurality of screws, preferably formed from dielectric material, are inserted through tapped openings 148 through 152 for partially occluding light from the laser diode to the photo diode for adjusting the coupling. First and second mounting holes 156 and 158 extend through the coupling block. When the coupling block of FIGS. 3 and 4 is used, a plurality of laser diodes is connected in series in place of laser diode 90, each one optically applied to one of photo diodes 100 and the photo diodes (not shown) in blocks 116 through 119.

The pockels cell driver of this invention provides especially fast clean pulses. As can be seen, a rise time of less than 5 nano seconds is achieved and the on voltage is very smooth. The on time is determined primarily by resistor 128, which discharges the gate capacitance of transistor 174. The exponential rate of return to the initial voltage is determined by the high voltage charging resistor R8, and the drain charge of power MOSFET 114.

As can be seen from FIG. 5, the timing jitter between the input trigger and the high voltage output pulse is very low. At a sweep speed of 500 nano seconds per division, with 1 kh passes, no jitter is noticeable. This is primarily due to the fast rise time provided by the laser diode-photo diode coupling.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A semiconductor switch for applying a high voltage across a pockels cell, comprising:

a plurality of semiconductor devices connected in series with the pockels cell and a capacitor, each of the semiconductor devices having a control input;

a plurality of fast light responsive devices, one fast light responsive device connected to the control input of each semiconductor device of the plurality of semiconductor devices respectively for switching the respective device from a non conducting state to a conducting state; and a controlled, fast rise time light source optically coupled to all of the fast light responsive devices for simultaneously triggering all of the semiconductor devices.

2. The semiconductor switch of claim 1 also comprising means connected between the light responsive devices and the controlled fast rise time light source for adjusting the coupling between the light source and each of the light responsive devices for equalizing the turn on times of the semiconductor devices.

3. The semiconductor switch of claim 2 in which the means connected between the light responsive devices and the controlled fast rise time light source for adjusting the coupling between the light source and each of the light responsive devices comprises a variable attenuator disposed between the light source and each of the devices.

4. The semiconductor switch of claim 3 in which the variable attenuator comprises an at least translucent member movable into a position between the light source and the light responsive device for adjustably occluding light from the source to reduce the light reaching the device.

5. The semiconductor switch of claim 4 in which the at least translucent member comprises a dielectric member.

6. The semiconductor switch of claim 1 comprising a fiber splitter including a plurality of optical fibers coupled at one end to the controlled, fast rise time light source, and having a plurality of other ends each other end including a substantially equal number of fibers coupled to one of the plurality of fast light responsive devices.

7. The semiconductor switch of claim 1 in which the controlled, fast rise time light source comprises a fast pulse laser diode.

8. The semiconductor switch of claim 1 in which the semiconductor devices comprise MOSFET high voltage switches.

9. The semiconductor switch of claim 7 in which the controlled, fast rise time light source is directly optically coupled to the plurality of fast light responsive devices, so that the photosensitive area of the fast light responsive devices intercepts the cone of radiation from laser diode.

10. The semiconductor switch of claim 9 further comprising a lens disposed between the fast rise time light source and the plurality of fast light responsive devices.

11. The semiconductor switch of claim 10 in which the lens comprises a gradient index lens.

12. The semiconductor switch of claim 7 in which the fast pulse laser diode light source and a photodiode are integrated in an optocoupler.

13. The semiconductor switch of claim 1 in which the total rise time of the plurality of semiconductor devices is less than about five nanoseconds.

* * * * *